VAN ZANDT M. MOORE.
VEHICLE WHEEL.
APPLICATION FILED AUG. 20, 1917.

1,375,717.

Patented Apr. 26, 1921.

2 SHEETS—SHEET 1.

INVENTOR,
Van Zandt M. Moore,
BY
Baker Macklin, ATTYS

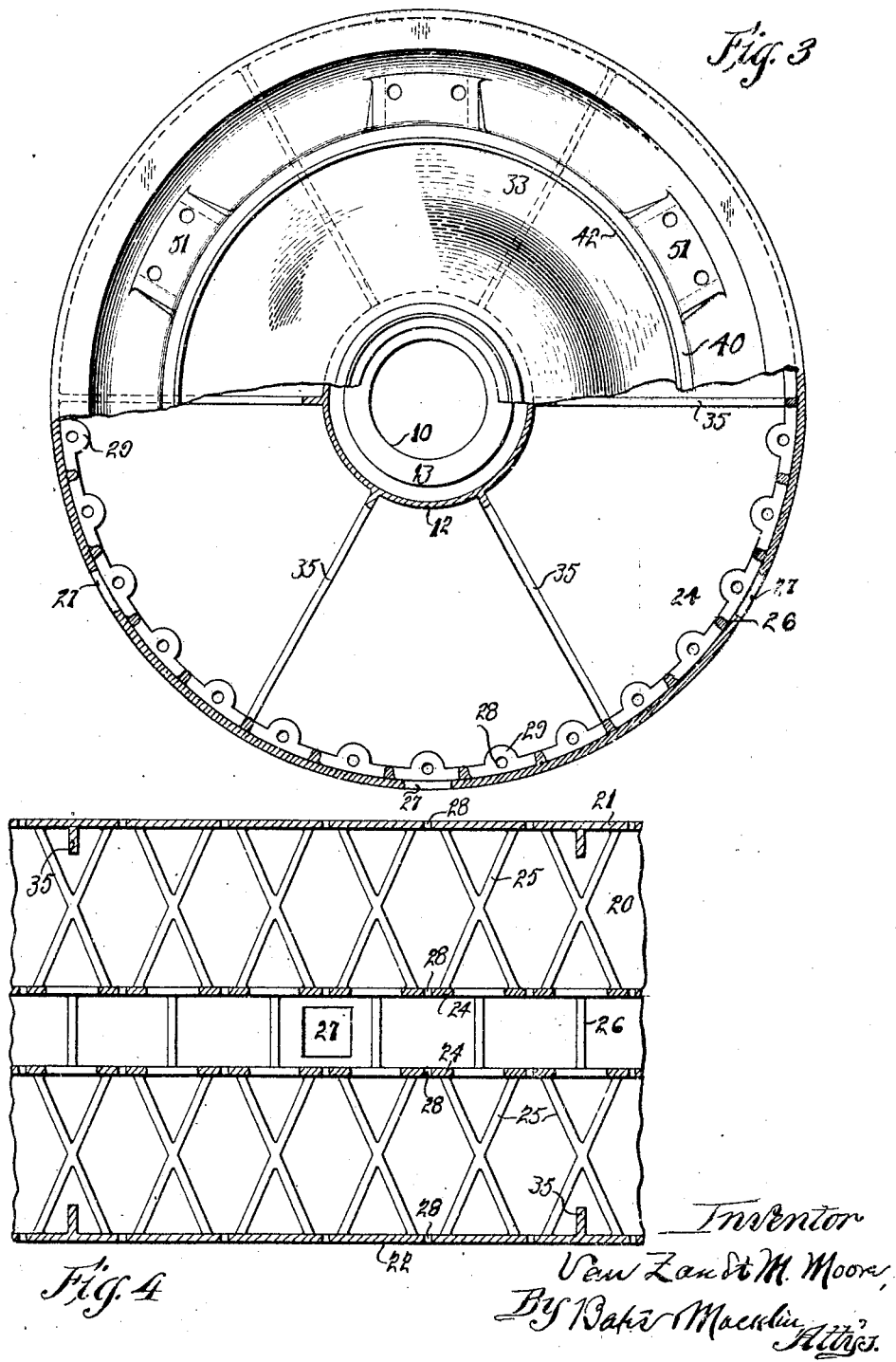

UNITED STATES PATENT OFFICE.

VAN ZANDT M. MOORE, OF CLEVELAND HEIGHTS, OHIO.

VEHICLE-WHEEL.

1,375,717.      Specification of Letters Patent.      Patented Apr. 26, 1921.

Application filed August 20, 1917. Serial No. 187,145.

*To all whom it may concern:*

Be it known that I, VAN ZANDT M. MOORE, a citizen of the United States, residing at Cleveland Heights, in the county of Cuyahoga and State of Ohio, have invented a certain new and useful Improvement in Vehicle-Wheels, of which the following is a full, clear, and exact description, reference being had to the accompanying drawings.

This invention relates to a wheel for automobile trucks and similar purposes. The object is to provide a very strong wheel which at the same time shall be light and cheap in construction and shall be adapted to carry existing forms of rubber tires. The wheel also has formed as a part of itself a flange for a suitable brake.

My wheel consists of a single integral casting and its various parts are formed of similar thickness so that if made of cast iron it may be readily malleablized.

The wheel is hereinafter more fully described in connection with the drawings illustrating the same, and the essential characteristics are summarized in the claims.

Figure 1:
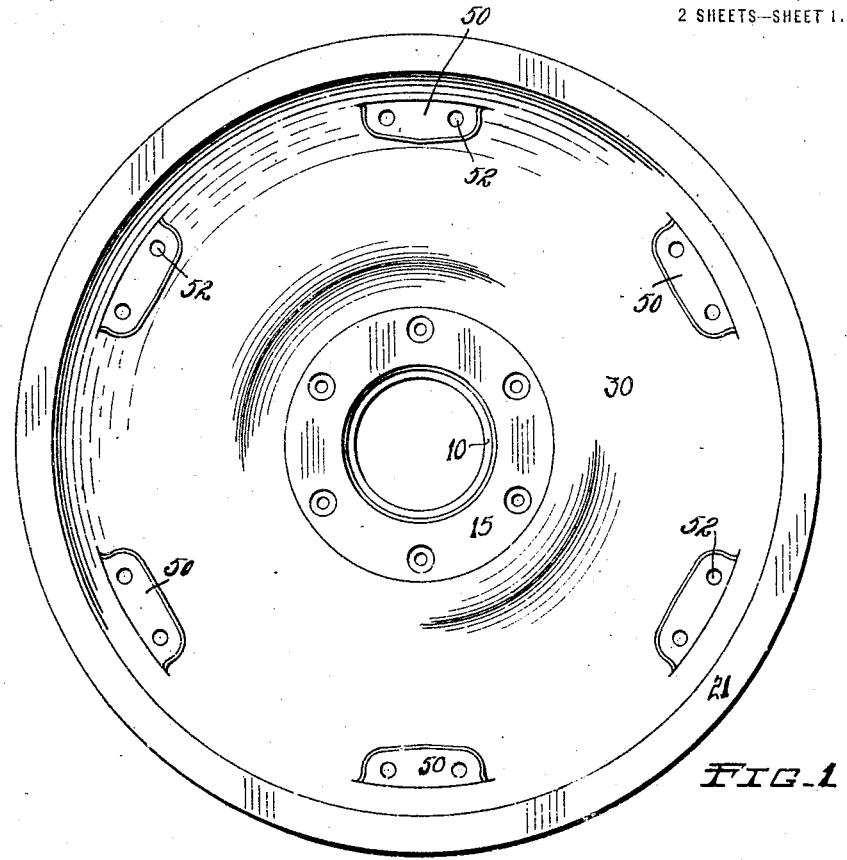
Figure 2:
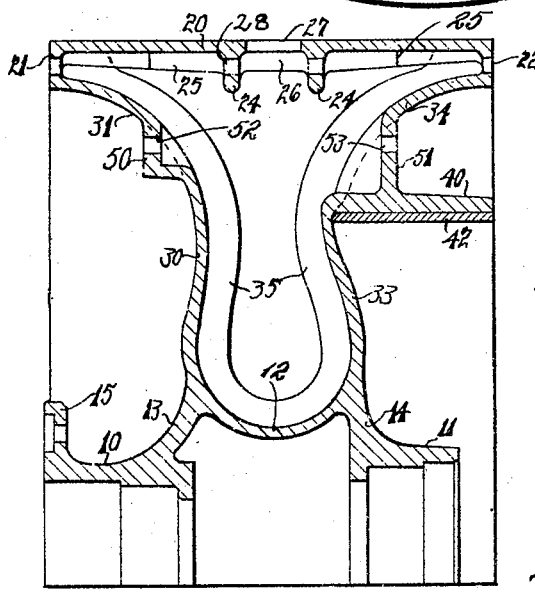

In the drawings, Figure 1 is a side elevation of the wheel looking from the outer side. Fig. 2 is an axial section of half of the wheel. Fig. 3 is a side elevation, partly sectional, of the wheel looking from the inner side. Fig. 4 is a development of the inner face of the rim.

While the wheel shown is one integral casting (with the exception of a brake-liner) it is convenient to refer to it as consisting of a hub, a rim, connecting webs and a brake-flange. These various portions of the wheel will now be described.

The hub consists of two sleeve-like portions 10 and 11, an intermediate portion 12 and connecting portions 13 and 14, as clearly shown in Fig. 2. The interior of the sleeves 10 and 11 is formed with reference to the particular kind of bearing the wheel is to carry. The portion 10 is also provided with a suitable flange 15 adapted to be connected to the outer end of the driving axle. The intermediate portion 12 is concaved outwardly and merges with the connecting portions 13 and 14, and all these parts merge with the two webs leading outwardly to the rim.

The rim is designated 20 and consists of a cylindrical tread portion, edge flanges 21 and 22 extending inwardly and connected at their inner ends with the webs, and suitable means for bracing the tread. The braces shown consist of two annular ribs 24, extending radially inward from the cylindrical rim part 20, and suitable transverse ribs. These transverse ribs consist preferably of diagonal members 25 between the annular ribs 24 and the edges of the wheel, and straight ribs 26 between the two annular ribs 24. All of these ribs connect along their outer portions with the tread and form an effective truss bracing the tread against inward or lateral crushing. This makes a very stiff and strong and at the same time light tread adapted to withstand all strains to which it may be put.

The diagonal ribs 25 are arranged in separate sets of two ribs each crossing each other, like a letter X, as shown in Fig. 4. This arrangement leaves spaces for the passage of bolts to hold on the tire, should the same be desired. For this purpose, alined holes 28 are made through the edge flanges 21 and 22 and the annular ribs 24. The annular ribs are strengthened where these holes are made, by inwardly projecting ears 29, as shown in Fig. 3.

The webs connecting the rim with the hub extend, as heretofore stated, outwardly from the junction of the hub portion 12 with the portions 13 and 14. At their outer ends, the webs connect with the inner edges of the edge flanges 21 and 22. Thus, as shown in Fig. 2, there is a web 30 leading outwardly from the junction of the hub portions 12 and 13 almost in a plane and then curving, as shown at 31, to the inner edge of the rim flange 21. On the inner side of the wheel a similar web 33 extends from the junction of the hub portions 12 and 14 outwardly nearly in the plane of the wheel and then curving as at 34 toward the inner face of the wheel where it joins the edge flange 22. The curves of the portions 31 and 34, the nearly straight portions 30 and 33, and the intermediate hub portion 12, merge into one another, so that it is no abrupt change from one portion to the other. The result is that the hub is effectively connected with the rim by two webs spaced apart and providing great strength.

To further strengthen and stiffen the wheel the webs 30 and 33 may be provided on their inner faces with a number of equidistant radial gusset flanges 35. These flanges are shown in Figs. 2 and 3. They start from the inner face of the rim between the diagonal ribs and extend inwardly along the inner sides of the edge flanges 21 and 22, and toward the center along the inner faces of the webs and come together on the periphery of the hub portion 12. These gusset flanges therefore brace the rim, webs and hub against lateral strains.

40, in Figs. 2 and 3, indicates an annular brake-flange concentric of the wheel axis and integral with the rest of the wheel. This flange leads outwardly from the web 33, and at its outer end extends no farther than the plane of the wheel edge 22, with the result that the brake-flange is protected by the wheel rim from breakage by accidental contact with stones along the road. The flange may be provided with a hardened steel brake-liner 42 adapted to be engaged by an internal expanding brake.

It is desirable that the wheel have means for attachment of non-skid chains. For this purpose I provide suitable bosses 50 and 51 on the outer and inner sides of the wheel which have holes 52 and 53 through which bolts may pass for the attachment of suitable hooks, not shown, carrying the tire chains. The bosses 50 are located at intervals along the outer side of the wheel and are made by forming a portion of the web 30, at these points, into parts parallel with the side of the wheel and connecting parts substantially parallel to the axis, as shown in Fig. 2. On the inner side of the wheel the bosses 51 lead inwardly from the curved portion 34 of the web, parallel with the side of the wheel, and at their inner ends abut the outer periphery of the brake-flange 40. These bosses thus serve also the purpose of bracing the brake-flange. The bosses 50 and 51 are located about the wheel in such position as will avoid the gusset flanges 35, as shown in Fig. 3.

My wheel is formed so that it may be readily cast. The core for the hub is of a form readily carried in the two mold members, and the core for the space between the webs and within the rim is supported by outward extensions projecting through openings 27 in the tread portion of the rim. The various walls of my wheel are of substantially the same thickness, so that if the wheel is of cast iron it may be readily malleablized.

Having thus described my invention, what I claim is:

1. In a wheel, the combination of a hub, a rim, two webs connecting the hub and rim, an annular rib on the inner face of the rim, and transverse ribs between the annular rib and the edge of the wheel, all of said ribs being contained within the hollow bounded by the rim and webs and out of contact with the webs except at the ends of the ribs.

2. In a cast metal wheel, the combination of a hub, a rim, two webs connecting the hub with the rim adjacent to its edges, a pair of parallel annular ribs formed on the inner face of the rim, and diagonal stiffening ribs on the inner face of the rim between the annular ribs and the edge of the rim, whereby the rim forms a reinforced bridge between the webs.

3. In a cast metal wheel, the combination of a hub, a rim with edge flanges, two webs connecting the hub with said edge flanges, a pair of annular ribs formed on the inner face of the rim, diagonal stiffening ribs on the inner face of the rim between the annular ribs and the edge flanges, and transverse stiffening ribs on the inner face of the rim between the two annular ribs.

4. In a wheel, the combination of a hub, a rim with edge flanges, webs connecting the hub with said edge flanges, and diagonal, radially narrow stiffening ribs on the inner face of the rim arranged to leave a space between them for the passage of bolts.

5. In a cast metal wheel, the combination of a hub, a rim with edge flanges, two webs connecting the hub with said edge flanges, a pair of annular ribs formed on the inner face of the rim, and diagonal stiffening ribs on the inner face of the rim between the annular ribs and the edge flanges, there being alined holes through the edge flanges and the two annular ribs positioned to avoid the diagonal ribs.

6. In a wheel, the combination of a rim, a hub, a web connecting the hub with the rim, a brake-flange integral with said web and extending therefrom in cylindrical form concentric with the axis of the wheel, and members leading to the outer side of the brake-flange from said web, said members bracing the brake-flange and furnishing means for anchoring the fastenings for tire chains.

7. In a wheel, the combination of a rim, a hub and two separated webs connecting the hub with the rim, a brake-flange integral with one of the webs and extending therefrom in cylindrical form concentric with the axis of the wheel, and members leading to the outer side of the brake-flange from the adjacent web and lying in a plane substantially parallel with the central plane of the wheel, said members bracing the brake-flange and furnishing means for anchoring the fastenings for tire chains.

8. In a wheel, the combination of a rim, a hub and two separated webs connecting the hub with the rim, a brake-flange integral with one of the webs, members leading to the side of the brake-flange from the adjacent web and bracing the brake-flange and furnishing means for anchoring the fastenings for tire chains, and stiffening members on the inner sides of the web.

9. In a wheel, the combination of a rim, a hub, a pair of separated webs connecting the hub with the rim and curving outwardly at their outer portions, a brake-flange integral with one of the webs and extending therefrom in a substantially cylindrical form, and seats for tire chain fastenings consisting of integral portions of the webs offset outwardly, said seats on the inner side of the wheel extending to the brake-flange and connected with it at their inner ends.

In testimony whereof, I hereunto affix my signature.

VAN ZANDT M. MOORE.